United States Patent
Kang et al.

(10) Patent No.: US 11,554,861 B2
(45) Date of Patent: Jan. 17, 2023

(54) DOWNWASH BLOCKING APPARATUS FOR AIR MOBILITY

(71) Applicants: HYUNDAI MOTOR COMPANY, Seoul (KR); KIA CORPORATION, Seoul (KR)

(72) Inventors: Seung Kyu Kang, Hwaseong-si (KR); Chae Uk Min, Hwaseong-si (KR); Seung Hee Yu, Seoul (KR); Dae Hyun Choi, Ansan-si (KR); Seoung Hyun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/474,513

(22) Filed: Sep. 14, 2021

(65) Prior Publication Data
US 2022/0153406 A1    May 19, 2022

(30) Foreign Application Priority Data
Nov. 13, 2020  (KR) .......................... 10-2020-0163560

(51) Int. Cl.
*B64C 27/26*     (2006.01)
*B64C 27/00*     (2006.01)
*B64C 27/20*     (2006.01)

(52) U.S. Cl.
CPC ............ *B64C 27/26* (2013.01); *B64C 27/006* (2013.01); *B64C 27/20* (2013.01)

(58) Field of Classification Search
CPC ....... B64C 27/26; B64C 27/006; B64C 27/20; B64C 11/001; B64C 29/0033; B64C 29/0025; B64C 29/0091; B64D 45/06; B64D 45/00; F16H 25/20
See application file for complete search history.

(56) References Cited

PUBLICATIONS

EASA, "Vertiports Prototype Technical Specifications for the Design of VFR Vertiports for Operation with Manned VTOL-Capable Aircraft", Mar. 24, 2022, All pages (Year: 2022).*

* cited by examiner

*Primary Examiner* — Valentina Xavier
(74) *Attorney, Agent, or Firm* — Morgan, Lewis & Bockius LLP

(57) ABSTRACT

The present invention relates to a downwash blocking apparatus of air mobility configured such that multi-stage guide shells configured for blocking downwash and guiding the downwash to a discharge portion of a vertiport are mounted to a rotor guide of a flying vehicle for air urban mobility to be movable upwards and downwards, whereby it is possible to prevent the downwash from affecting passengers at the time of boarding and deboarding, and therefore it is possible to solve passenger inconvenience at the time of boarding and deboarding.

19 Claims, 8 Drawing Sheets

[ PRIOR ART ]

DOWNWASH BLOCKING APPARATUS FOR AIR MOBILITY

CROSS-REFERENCE TO RELATED APPLICATION

The present application claims priority to Korean Patent Application No. 10-2020-0163560 filed on Nov. 30, 2020, the entire contents of which is incorporated herein for all purposes by this reference.

BACKGROUND OF THE INVENTION

Field of the Invention

The present invention relates to a downwash blocking apparatus for air mobility, and more particularly to a downwash blocking apparatus for air mobility capable of blocking downwash generated at the time of takeoff and landing of a flying vehicle for air mobility, solving passenger inconvenience at the time of boarding and deboarding.

Description of Related Art

Urban air mobility (UAM) for future transportation and traffic systems is under development.

One of the most important things in developing urban air mobility is to develop a flying car capable of performing vertical takeoff and landing and a vertiport, which is a takeoff and landing area for the flying car.

FIG. 1 is a schematic view showing an example of a flying car for urban air mobility and a vertiport.

As shown in FIG. 1, the flying car 100 for urban air mobility may include a body portion 110 for passengers, wing portions 120 formed at opposite sides of the body portion 110, a rotor guide 130 mounted to the end of each wing portion 120, and a propeller type rotor 140 rotatably mounted in the rotor guide 130 to generate substantial lift.

Furthermore, the vertiport, which is a vertical takeoff and landing area for the flying car, may be manufactured to have various structures facilitating takeoff and landing.

At the time of takeoff and landing of the flying car 100 for urban air mobility, a strong air current generated due to rotational force of the rotor 140 is blown toward the vertiport 200. This strong air current is called downwash.

At the time of boarding and deboarding, therefore, passengers undergo inconvenience due to the downwash, which is a kind of turbulent air.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a downwash blocking apparatus of air mobility configured such that multi-stage guide shells configured for blocking downwash and guiding the downwash to a discharge portion of a vertiport are mounted to a rotor guide of a flying vehicle for air urban mobility to be movable upwards and downwards, whereby it is possible to prevent the downwash from affecting passengers at the time of boarding and deboarding, and therefore it is possible to solve passenger inconvenience at the time of boarding and deboarding.

The objects of the present invention are not limited to those described above, and other unmentioned objects of the present invention will be clearly understood by a person of ordinary skill in the art (hereinafter referred to as an "ordinary skilled person") from the following description.

To accomplish the object, in an aspect, various aspects of the present invention are directed to providing a downwash blocking apparatus of air mobility, the downwash blocking apparatus including a rotor guide, to which a rotor of a flying vehicle for the air mobility is rotatably mounted, a plurality of guide shells mounted to the rotor guide to be slidably coupled to each other and configured to be movable upwards and downwards with respect to the rotor guide, the guide shells being configured to block downwash blown from the rotor to a vertiport, and a driving device mounted to the rotor guide and the guide shells and coupled to the guide shells, the driving device being configured to move the guide shells upwards and downwards.

The rotor guide may be provided with a guide shell reception space open in a downward direction and may be provided with three or more driving device mounting spaces partitioned from the guide shell reception space to be convex outwards at equidistant intervals in a circumferential direction of the rotor guide.

The plurality of guide shells may be configured in a multi-stage structure in which at least three guide shells are slidably coupled to each other.

The plurality of guide shells may include a first guide shell connected to the rotor guide to be movable upwards and downwards, a second guide shell having a diameter smaller than a diameter of the first guide shell, the second guide shell being connected to the first guide shell to be movable upwards and downwards, and a third guide shell having a diameter smaller than the diameter of the second guide shell, the third guide shell being connected to the second guide shell and movable upwards and downwards with respect to the second guide shell by operation of one of the driving devices.

A ground coupler configured to be brought into airtight contact with the surface of the vertiport may be mounted to the lower end portion of the third guide shell, which is located at the lowest position among the plurality of guide shells.

The driving device may include a first motor mounted in each driving device mounting space of the rotor guide, a first screw shaft connected to an output shaft of the first motor, the first screw shaft being arranged in a downward direction of the output shaft of the first motor, and a first upward-downward movement guide bracket having a female screw portion, with which the first screw shaft is screw-engaged, the first upward-downward movement guide bracket being mounted to the upper end portion of the first guide shell among the plurality of guide shells, to protrude outwards from an axis of the rotor guide.

A first stopper, caught by a bottom portion of the first upward-downward movement guide bracket to limit the maximum downward movement distance of the first guide shell, may be mounted to the lower end portion of the first screw shaft.

The driving device may further include a first motor mounting bracket mounted to the upper end portion of the first guide shell among the plurality of guide shells, to protrude inwards, a second motor mounted to the first motor mounting bracket, a second screw shaft connected to an output shaft of the second motor, and a second upward-downward movement guide bracket having a female screw portion, with which the second screw shaft is screw-engaged, the second upward-downward movement guide bracket being mounted to the upper end portion of the second guide shell to protrude outwards from an axis of the rotor guide.

A second stopper, selectively caught by a bottom portion of the second upward-downward movement guide bracket to limit the maximum downward movement distance of the second guide shell, may be mounted to the lower end portion of the second screw shaft.

The driving device may further include a second motor mounting bracket mounted to the upper end portion of the second guide shell to protrude inwards, a third motor mounted to the second motor mounting bracket, a third screw shaft rotatably connected to an output shaft of the third motor, and a third upward-downward movement guide bracket having a female screw portion, with which the third screw shaft is screw-engaged, the third upward-downward movement guide bracket being mounted to the upper end portion of the third guide shell to protrude outwards from an axis of the rotor guide.

A third stopper, caught by a bottom portion of the third upward-downward movement guide bracket to limit the maximum downward movement distance of the third guide shell, may be mounted to the lower end portion of the third screw shaft.

The downwash blocking apparatus may further include a distance sensor mounted to a predetermined position of the lower portion of the rotor guide, the distance sensor being configured to detect the distance from the surface of the vertiport, and a controller configured to apply a driving signal to the driving device in the case in which the distance detected by the distance sensor is less than the vertical length of the plurality of guide shells after deployment of the plurality of guide shells.

When the plurality of guide shells is moved downwards to be deployed as the result of driving of the driving device according to the driving signal of the controller, the flow of the downwash blown from the rotor to the vertiport at the time of takeoff and landing of the flying vehicle may be guided into the guide shells.

The controller may apply a restoration driving signal to the driving device such that the deployment length of each guide shell is reduced in proportion to the distance detected by the distance sensor being reduced until the flying vehicle lands on the vertiport after the plurality of guide shells is deployed.

The vertiport may be provided with a downwash discharge port configured to discharge the downwash blown from the rotor into the guide shells.

Other aspects and exemplary embodiments of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
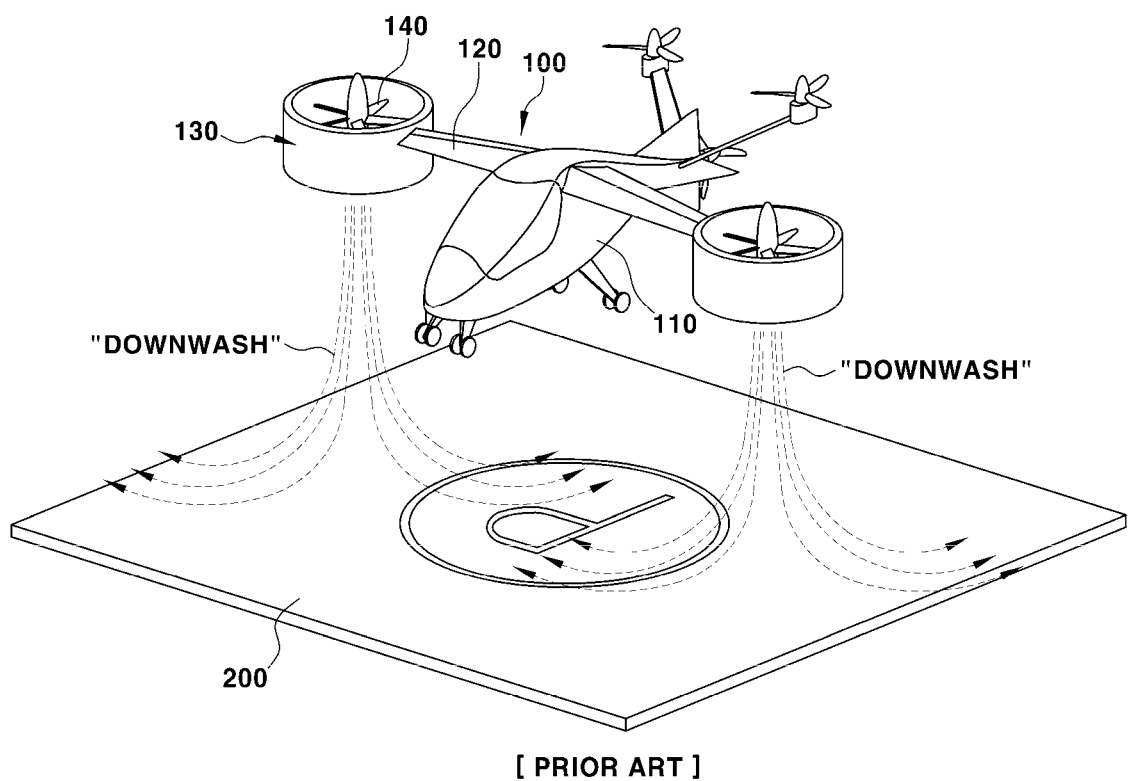
FIG. 1 is a schematic view showing that downwash is generated when a flying vehicle for conventional air mobility takes off from a vertiport and lands on the vertiport.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes, will be determined in part by the particular intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

Hereinafter, of the present invention an exemplary embodiment of the present invention will be described in detail with reference to the accompanying drawings.

Figure 2:
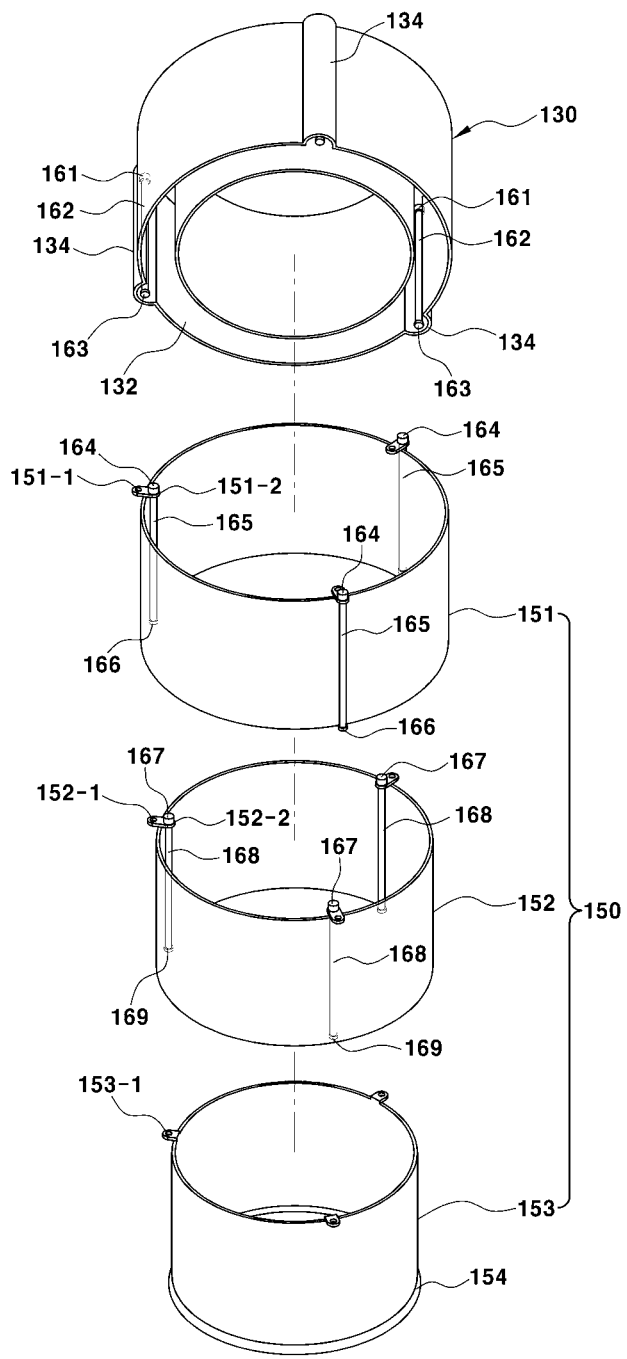
FIG. 2 is an exploded perspective view showing a downwash blocking apparatus of air mobility according to various exemplary embodiments of the present invention.
Figure 3:
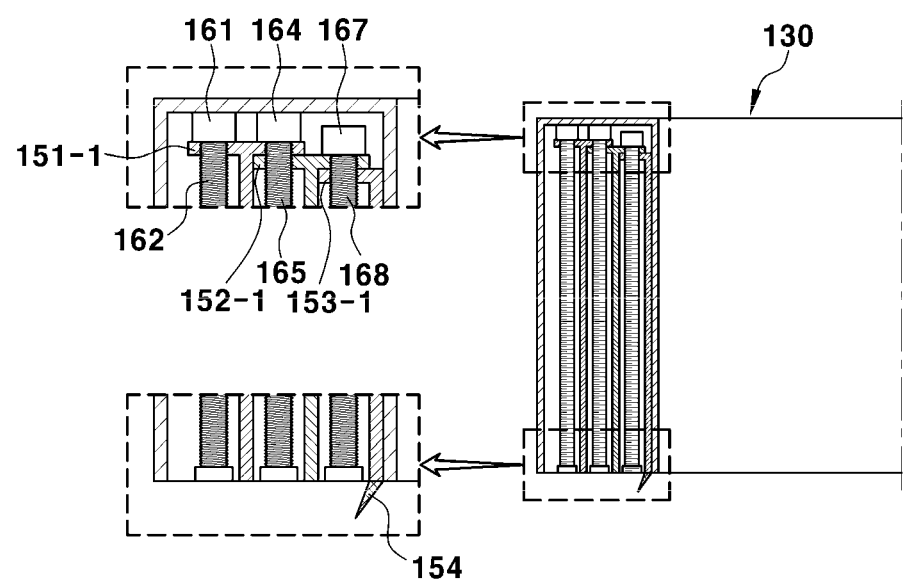
FIG. 3 is a sectional view of the downwash blocking apparatus of air mobility according to various exemplary embodiments of the present invention, showing the state of guide shells before deployment.
Figure 4:
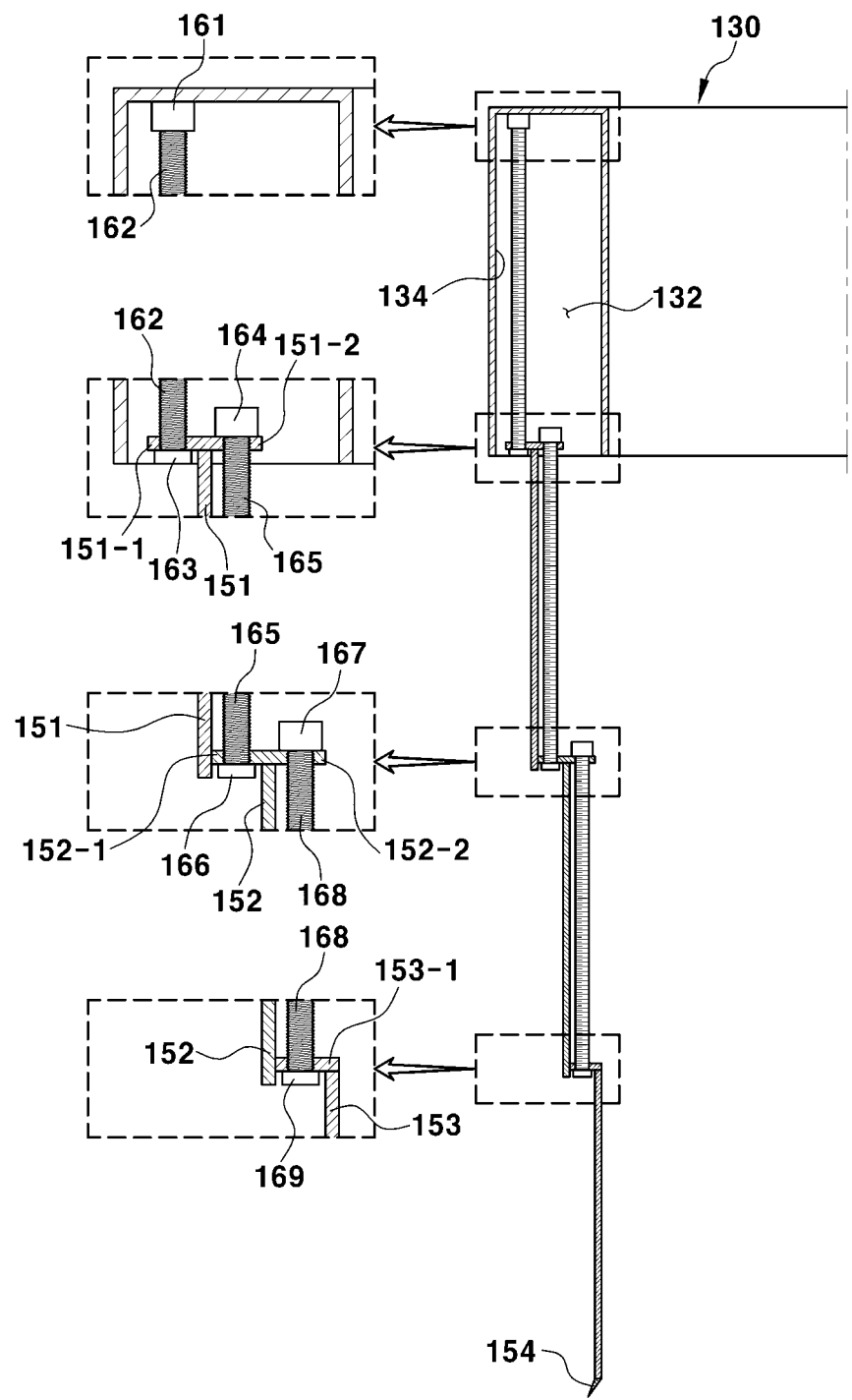
FIG. 4 is a sectional view of the downwash blocking apparatus of air mobility according to various exemplary embodiments of the present invention, showing the state of the guide shells after deployment.

FIG. 2 is an exploded perspective view showing a downwash blocking apparatus of air mobility according to various exemplary embodiments of the present invention, and FIG. 3 and FIG. 4 are sectional views showing the state of guide shells according to various exemplary embodiments of the present invention before and after deployment, respectively, wherein reference numeral 130 indicates a rotor guide.

A propeller type rotor configured to generate substantial lift at the time of takeoff and landing of a flying vehicle for air mobility is rotatably mounted in an internal diameter portion of the rotor guide 130.

As shown in FIG. 2, a guide shell reception space 132, open in a downward direction thereof, is defined in the rotor guide 130, and the guide shell reception space 132 is formed as a space having a circular ring section such that a plurality of cylindrical guide shells are received therein in the state of overlapping each other.

The plurality of guide shells 150 are disposed in the guide shell reception space 132 of the rotor guide 130 in the state of overlapping each other to be movable upwards and downwards. When the guide shells 150 are moved downwards to be deployed while forming a long cylinder extending upwards and downwards, a function of blocking downwash blown from the rotor to a vertiport is performed.

To the present end, the plurality of guide shells 150 is configured in a multi-stage structure in which at least three guide shells are slidably coupled to each other.

The plurality of guide shells 150 includes a first guide shell 151 connected to the rotor guide 130 to be movable upwards and downwards, a second guide shell 152 having a smaller diameter than the first guide shell 151, the second guide shell 152 being connected to the first guide shell 151 to be movable upwards and downwards, and a third guide shell 153 having a smaller diameter than the second guide shell 152, the third guide shell 153 being connected to the second guide shell 152 to be movable upwards and downwards.

When the first, second, and third guide shells 151, 152, and 153 are disposed in the guide shell reception space 132 of the rotor guide shell 130 in the state of overlapping each other, the second guide shell 152 is located in an internal diameter portion of the first guide shell 151 and the third guide shell 153 is located in an internal diameter portion of the second guide shell 152, as shown in FIG. 4.

A ground coupler 154, which is a kind of airtight member as configured to be brought into airtight contact with the surface of the vertiport 200, is mounted to the lower end portion of the third guide shell 153, which is located at the lowest position among the plurality of guide shells 150.

Meanwhile, a driving device configured to move the guide shells upwards and downwards is mounted to the rotor guide 130 and the guide shells 150.

The driving device may have a structure configured for connecting the first guide shell 151 to the rotor guide 130 to be movable upwards and downwards, connecting the second guide shell 152 to the first guide shell 151 to be movable upwards and downwards, and connecting the third guide shell 153 to the second guide shell 152 to be movable upwards and downwards.

To the present end, the rotor guide 130 is further provided with three or more driving device mounting spaces 134 partitioned from the guide shell reception space 132 to be convex outwards at equidistant intervals in a circumferential direction of the rotor guide.

As a configuration of the driving device, a first motor 161 configured to move the first guide shell upwards and downwards is mounted in each driving device mounting space 134 of the rotor guide 130, and a first screw shaft 162 is rotatably connected to an output shaft of the first motor 161. These elements are disposed in an upward-downward direction thereof.

Furthermore, a first upward-downward movement guide bracket 151-1 having a female screw portion, with which the first screw shaft 162 is screw-engaged, is mounted to the upper end portion of the first guide shell 151, among the plurality of guide shells 150, to protrude outwards.

A first stopper 163, caught by a bottom portion of the first upward-downward movement guide bracket 151-1 to limit the maximum downward movement distance of the first guide shell 151 and to prevent separation thereof, is mounted to the lower end portion of the first screw shaft 162.

As another configuration of the driving device, a first motor mounting bracket 151-2 is mounted to the upper end portion of the first guide shell 151 to protrude inwards, a second motor 164 is mounted to the first motor mounting bracket 151-2, and a second screw shaft 165 is rotatably connected to an output shaft of the second motor 164. These elements are disposed in the upward-downward direction thereof.

Furthermore, a second upward-downward movement guide bracket 152-1 having a female screw portion, with which the second screw shaft 165 is screw-engaged, is mounted to the upper end portion of the second guide shell 152 to protrude outwards.

A second stopper 166, caught by a bottom portion of the second upward-downward movement guide bracket 152-1 to limit the maximum downward movement distance of the second guide shell 152 and to prevent separation thereof, is mounted to the lower end portion of the second screw shaft 165.

As a further configuration of the driving device, a second motor mounting bracket 152-2 is mounted to the upper end portion of the second guide shell 152 to protrude inwards, a third motor 167 is mounted to the second motor mounting bracket 152-2, and a third screw shaft 168 is rotatably connected to an output shaft of the third motor 167. These elements are arranged in the upward-downward direction thereof.

Furthermore, a third upward-downward movement guide bracket 153-1 having a female screw portion, with which the third screw shaft 168 is screw-engaged, is mounted to the upper end portion of the third guide shell 153 to protrude outwards.

A third stopper 169, caught by a bottom portion of the third upward-downward movement guide bracket 153-1 to limit the maximum downward movement distance of the third guide shell 153 and to prevent separation thereof, is mounted to the lower end portion of the third screw shaft 168.

Figure 8:
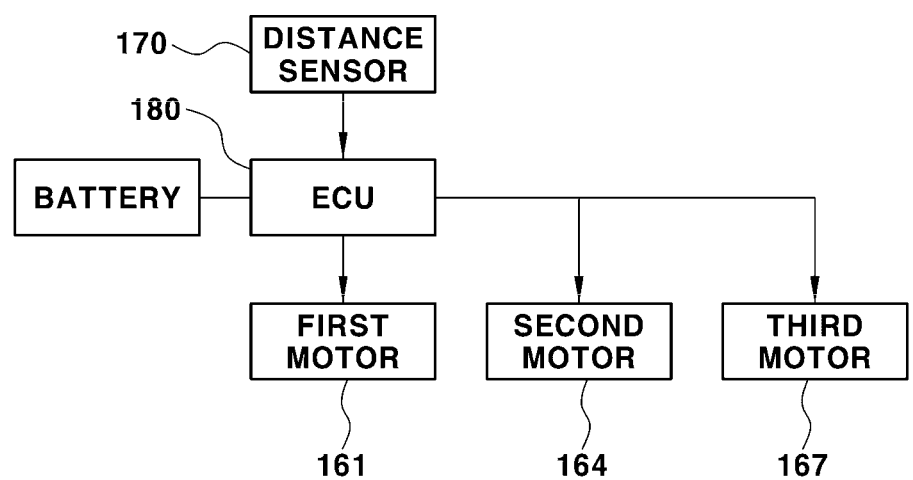
FIG. 8 is a control schematic diagram for the downwash blocking apparatus of air mobility according to various exemplary embodiments of the present invention.

As shown in FIG. 8, the downwash blocking apparatus according to various exemplary embodiments of the present invention further includes a distance sensor 170 mounted to a predetermined position of the lower portion of the rotor guide 130 to detect the distance from the surface of the vertiport and a controller 180 configured to apply a driving signal to each of the motors 161, 164, and 167 of the driving device in the case in which the distance detected by the distance sensor 160 is less than the vertical length of the plurality of guide shells 150 after complete deployment.

When the motors 161, 164, and 167 of the driving device are driven and thus the plurality of guide shells 150 is moved downwards to be deployed, the flow of downwash blown from the rotor 140 to the vertiport 200 at the time of takeoff and landing of a flying vehicle may be guided into the guide shells 150.

When the first screw shaft 162 is rotated according to unidirectional rotation of the first motor 161, the first guide shell 151 is moved downwards, since the first screw shaft 162 is screw-engaged with the first upward-downward movement guide bracket 151-1 formed at the first guide shell 151.

At the same time, when the second screw shaft 165 is rotated according to unidirectional rotation of the second motor 164, the second guide shell 152 is moved downwards, since the second screw shaft 165 is screw-engaged with the second upward-downward movement guide bracket 152-1 formed at the second guide shell 152.

Furthermore, when the third screw shaft 168 is rotated according to unidirectional rotation of the third motor 167, the third guide shell 153 is moved downwards, since the third screw shaft 168 is screw-engaged with the third upward-downward movement guide bracket 153-1 formed at the third guide shell 153.

At the present time, the ground coupler 154 mounted to the lower end portion of the third guide shell 153 is brought into airtight contact with the surface of the vertiport 200.

Figure 6:
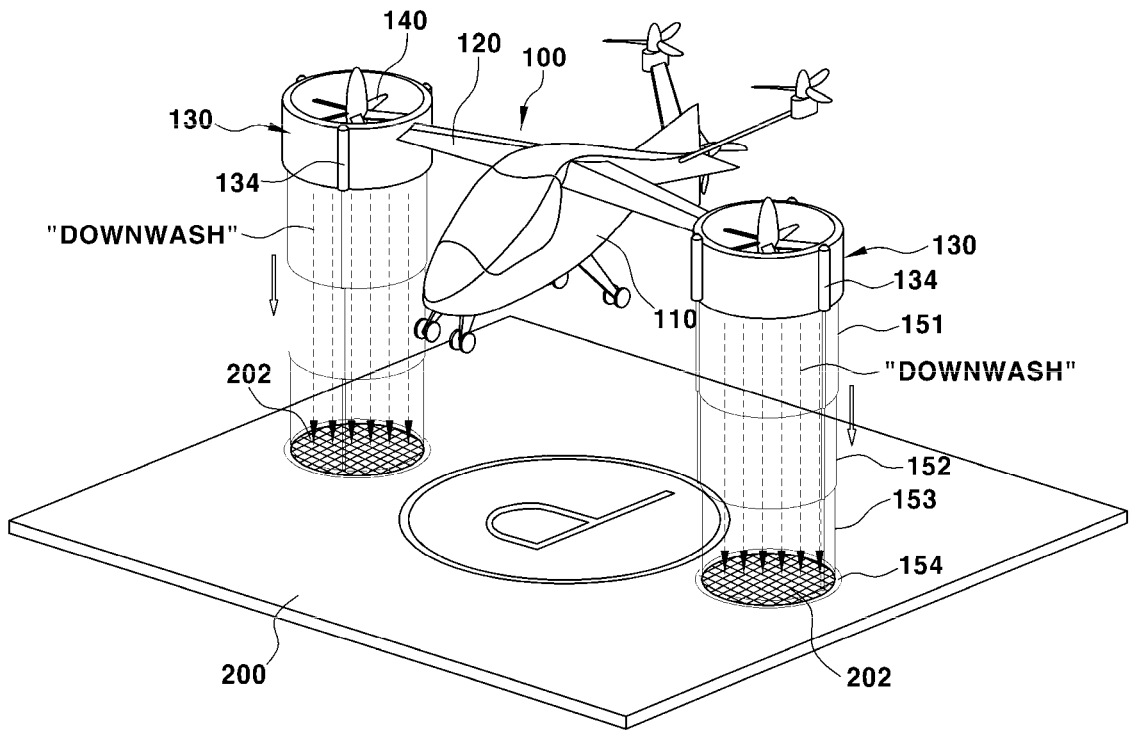

As the first, second, and third guide shells 151, 152, and 153 are moved downwards to be deployed, as described above, the first, second, and third guide shells 151, 152, and 153 are vertically arranged between the rotor 140 and the vertiport 200, as shown in FIG. 6.

A downwash discharge port 202 configured to discharge downwash blown from the rotor 140 into the guide shells 150 is formed in the vertiport 200, and the ground coupler 154 is brought into tight contact with the external circumferential surface of the downwash discharge port 202.

Consequently, the downwash blown from the rotor passes through the interiors of the first, second, and third guide shells 151, 152, and 153, deployed as described above, and is discharged through the downwash discharge port 202, whereby passengers are not affected by the downwash at the time of boarding and deboarding, and therefore it is possible to greatly improve passenger convenience at the time of boarding and deboarding.

Hereinafter, an example of takeoff and landing of the flying vehicle for air mobility and deployment of the guide shells will be described.

Figure 5:
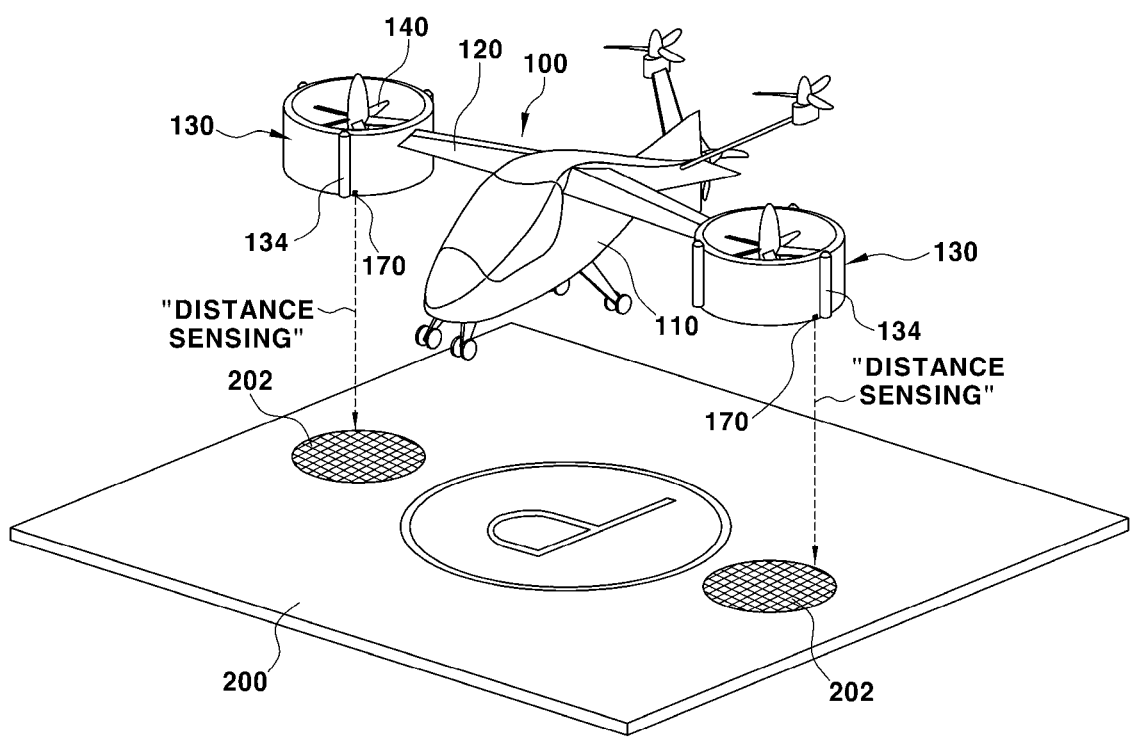
FIG. 5, FIG. 6, and FIG. 7 are schematic views sequentially showing the operation of the downwash blocking apparatus of air mobility according to various exemplary embodiments of the present invention.
Figure 7:
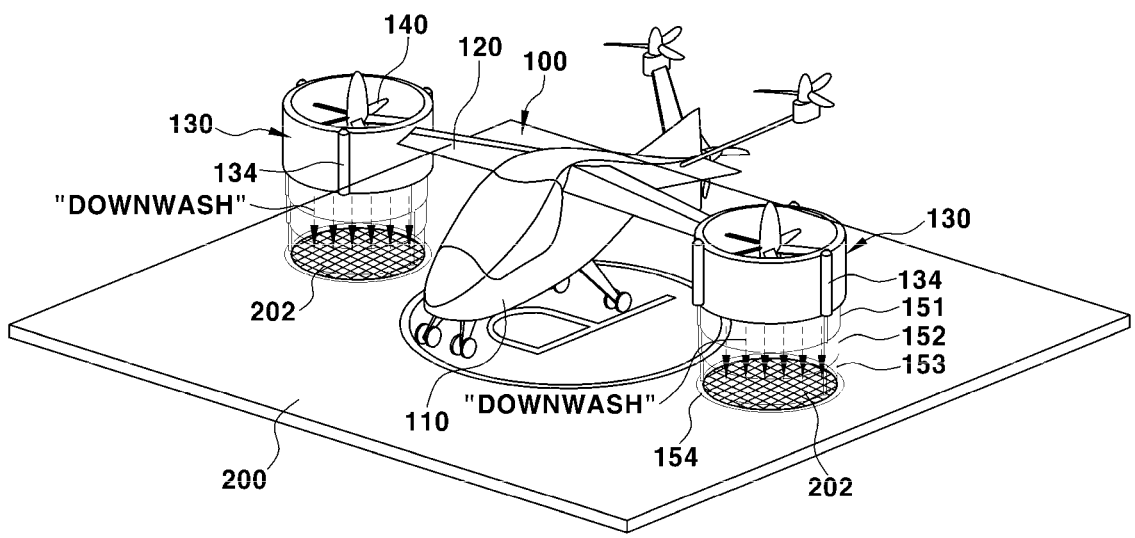
Figure 9:
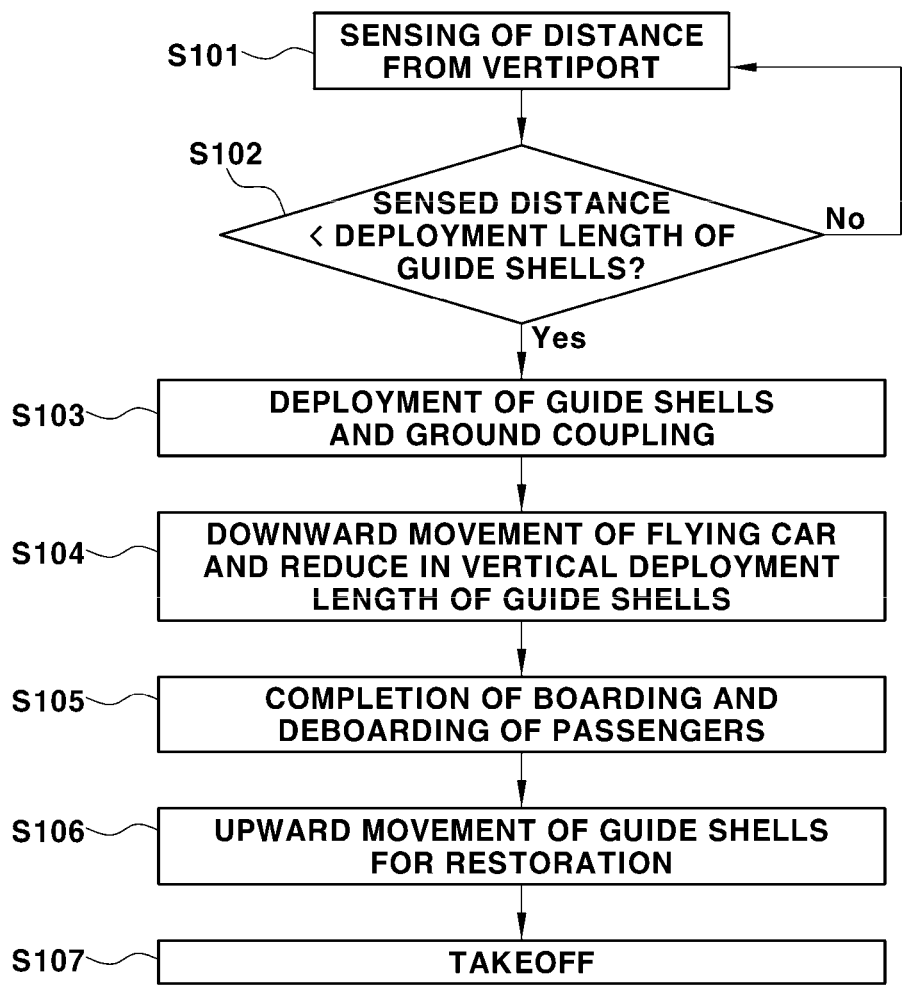
FIG. 9 is a flowchart showing the operation of the downwash blocking apparatus of air mobility according to various exemplary embodiments of the present invention.

FIG. 5, FIG. 6, and FIG. 7 are views sequentially showing the operation of the downwash blocking apparatus of air mobility according to various exemplary embodiments of the present invention, and FIG. 9 is a flowchart showing the operation of the downwash blocking apparatus of air mobility according to various exemplary embodiments of the present invention.

First, when the flying vehicle 100 is located above the vertiport 200 for landing after flight, as shown in FIG. 5, the distance sensor 170 detects the distance from the vertiport 200 (S101), and a detected signal is transmitted to the controller 180.

Subsequently, the controller 180 compares the distance detected by the distance sensor 160 with the vertical length of the plurality of guide shells 150 when fully deployed (S102).

In the case in which the distance detected by the distance sensor 160 is less than the vertical length of the plurality of guide shells 150 when fully deployed as the result of comparison, deployment of the plurality of guide shells 150 is performed, as described above (S103).

To the present end, the controller 180 applies driving signals to the motors 161, 164, and 167, whereby driving of the first motor 161 and downward movement of the first guide shell 151 due to rotation of the first screw shaft 162, driving of the second motor 164 and downward movement of the second guide shell 152 due to rotation of the second screw shaft 165, and driving of the third motor 167 and downward movement of the third guide shell 153 due to rotation of the third screw shaft 168 are performed, as described above. As shown in FIG. 6, therefore, the first, second, and third guide shells 151, 152, and 153 are vertically arranged while being connected to the rotor 140 and the vertiport 200.

Consequently, downwash blown from the rotor 140 passes through the interiors of the first, second, and third guide shells 151, 152, and 153 deployed as described above, and is discharged through the downwash discharge port 202 of the vertiport 200, whereby no downwash reaches passengers at the time of boarding and deboarding.

After the plurality of guide shells 150 is completely deployed, the flying vehicle 100 starts to move downwards to land on the vertiport 200.

When the flying vehicle 100 moves downwards to land on the vertiport 200, the vertical deployment length of the first, second, and third guide shells 151, 152, and 153 deployed as described above may be reduced to prevent damage thereto.

That is, the vertical deployment length of the first, second, and third guide shells 151, 152, and 153 may be proportionally reduced until the flying vehicle 100 lands on the vertiport 200.

To the present end, the controller 180 applies a restoration driving signal to the driving device such that the deployment length of each guide shell 150 is reduced in proportion to the distance detected by the distance sensor 170 being reduced until the flying vehicle 100 lands on the vertiport 200 after the plurality of guide shells 150 is deployed.

In other words, when the distance sensor 170 detects that the distance from the vertiport 200 gradually decreases due to downward movement of the flying vehicle 100 and transmits the same to the controller 180, the controller 180 applies reverse driving signals to the first, second, and third motors 161, 164, and 167 such that the deployment length of each guide shell 150 is reduced (S104).

When the flying vehicle 100 moves downwards until the flying vehicle 100 lands on the vertiport 200, the distance from the vertiport 200 detected by the distance sensor 170 is proportionally reduced, and therefore the controller 180 may apply reverse driving signals to the first, second, and third motors 161, 164, and 167 such that the deployment length of each guide shell 150 is proportionally reduced.

Even when the flying vehicle 100 lands on the vertiport 200, therefore, only the vertical deployment length of the first, second, and third guide shells 151, 152, and 153 is reduced, and the first, second, and third guide shells 151, 152, and 153 are configured to continuously guide the downwash from the rotor 140 to the downwash discharge port 202 of the vertiport 200.

After the flying vehicle 100 lands on the vertiport 200, passengers may board and deboard (S105).

At the present time, the downwash blown from the rotor 140 through the first, second, and third guide shells 151, 152, and 153 is continuously discharged through the downwash discharge port 202 of the vertiport 200. As a result, the downwash does not reach the passengers at the time of boarding and deboarding, whereby it is possible to solve passenger inconvenience due to downwash at the time of boarding and deboarding and to improve passenger convenience at the time of boarding and deboarding.

Meanwhile, when the flying vehicle 100 is ready to take off after passengers board and deboard, switch manipulation of a driver or a wireless manipulation signal of a smart device may be transmitted to the controller 180 such that the guide shells 150 are return to the original positions thereof to overlap each other.

Correspondingly, the controller 180 applies reverse driving signals to the first, second, and third motors 161, 164, and 167 such that the guide shells 150 are moved upwards to be received in the guide shell reception space 132 of the rotor guide 130 in an overlapping state (S106).

After the guide shells 150 are received in the guide shell reception space 132 of the rotor guide 130 in an overlapping state, as described above, the flying vehicle 100 may take off (S107).

As described above, the multi-stage guide shells are mounted to the rotor guide of the flying vehicle for air mobility to be movable upwards and downwards such that downwash blown from the rotor to the vertiport at the time of takeoff and landing of the flying vehicle is guided into the interiors of the guide shells, whereby it is possible to prevent the downwash from affecting passengers at the time of boarding and deboarding. Consequently, it is possible to solve passenger inconvenience due to downwash at the time of boarding and deboarding and to improve passenger convenience at the time of boarding and deboarding, whereby it is possible to preoccupy future UAM hub standard technology.

As is apparent from the foregoing, the present invention may have the following effects.

First, the multi-stage guide shells are mounted to the rotor guide of the flying vehicle for air mobility to be movable upwards and downwards such that downwash blown from the rotor to the vertiport at the time of takeoff and landing of the flying vehicle is guided into the interiors of the guide shells, whereby it is possible to prevent the downwash from affecting passengers at the time of boarding and deboarding. Consequently, it is possible to solve passenger inconvenience due to downwash at the time of boarding and deboarding.

Second, the guide shells easily block downwash from being blown to the vertiport and spreading outwards, whereby it is possible to block downwash, which is a kind of turbulent air, from reaching passengers at the time of boarding and deboarding and to improve passenger convenience at the time of boarding and deboarding, whereby it is possible to preoccupy future UAM hub standard technology.

The effects of the present invention are not limited to those mentioned above, and other unmentioned effects will be clearly understood by an ordinary skilled person from the above description.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A downwash blocking apparatus for air mobility, the downwash blocking apparatus comprising:
   a rotor guide, to which a rotor of a flying vehicle for the air mobility is rotatably mounted;
   a plurality of guide shells mounted to the rotor guide to be slidably coupled to each other and configured to be movable upwards and downwards with respect to the rotor guide, the plurality of guide shells being configured to block downwash blown from the rotor to a vertiport; and
   driving devices mounted to the rotor guide and the plurality of guide shells and coupled to the plurality of guide shells, the driving devices being configured to move the plurality of guide shells upwards and downwards with respect to the rotor guide.

2. The downwash blocking apparatus according to claim 1, wherein the rotor guide is provided with a guide shell reception space open in a downward direction of the rotor guide.

3. The downwash blocking apparatus according to claim 2, wherein the rotor guide is provided with three or more driving device mounting spaces partitioned from the guide shell reception space to be convex outwards at equidistant intervals in a circumferential direction of the rotor guide.

4. The downwash blocking apparatus according to claim 1, wherein the plurality of guide shells is telescopically coupled and slidable to each other.

5. The downwash blocking apparatus according to claim 4, wherein the plurality of guide shells includes:
   a first guide shell connected to the rotor guide and movable upwards and downwards with respect to the rotor guide by operation of one of the driving devices;
   a second guide shell having a diameter smaller than a diameter of the first guide shell, the second guide shell being connected to the first guide shell and movable upwards and downwards with respect to the first guide shell by operation of one of the driving devices; and
   a third guide shell having a diameter smaller than the diameter of the second guide shell, the third guide shell being connected to the second guide shell and movable upwards and downwards with respect to the second guide shell by operation of one of the driving devices.

6. The downwash blocking apparatus according to claim 5, wherein a ground coupler configured to be brought into airtight contact with a surface of the vertiport is mounted to a lower end portion of the third guide shell, which is located at a lowest position among the plurality of guide shells.

7. The downwash blocking apparatus according to claim 1, wherein a ground coupler configured to be brought into airtight contact with a surface of the vertiport is mounted to a lower end portion of a guide shell, which is located at a lowest position among the plurality of guide shells.

8. The downwash blocking apparatus according to claim 1, wherein the driving devices include a first driving device having:
   a first motor mounted to the rotor guide;
   a first screw shaft connected to an output shaft of the first motor;
   a first upward-downward movement guide bracket having a female screw portion, with which the first screw shaft is screw-engaged, the first upward-downward movement guide bracket being mounted to an upper end portion of a guide shell, which is located at a highest position among the plurality of guide shells; and
   a stopper mounted to a lower end portion of the first screw shaft and selectively caught by a bottom portion of the first upward-downward movement guide bracket to limit a maximum downward movement distance of the guide shell which is located at the highest position among the plurality of guide shells.

9. The downwash blocking apparatus according to claim 8,
   wherein the driving devices further include at least a second driving device, and
   wherein each of the at least a second driving device includes:
   a second motor mounting bracket mounted to an upper end portion of one of the plurality of guide shells except the guide shell which is located at the highest position;
   a second motor mounted to a first motor mounting bracket of one of the at least a second driving device;
   a second screw shaft connected to an output shaft of the second motor;
   a second upward-downward movement guide bracket having a female screw portion, with which the second screw shaft is screw-engaged, the second upward-downward movement guide bracket being mounted to an upper end portion of another of the plurality of guide shells; and
   a second stopper mounted to a lower end portion of the second screw shaft and selectively caught by a bottom portion of the second upward-downward movement guide bracket.

10. The downwash blocking apparatus according to claim 1, wherein the driving devices include:
    a first motor mounted in each driving device mounting space of the rotor guide;
    a first screw shaft connected to an output shaft of the first motor, the first screw shaft being arranged in a downward direction of the output shaft of the first motor; and
    a first upward-downward movement guide bracket having a female screw portion, with which the first screw shaft is screw-engaged, the first upward-downward movement guide bracket being mounted to an upper end portion of a first guide shell among the plurality of guide shells, to protrude outwards from an axis of the rotor guide.

11. The downwash blocking apparatus according to claim 10, wherein a first stopper, caught by a bottom portion of the first upward-downward movement guide bracket to limit a maximum downward movement distance of the first guide shell, is mounted to a lower end portion of the first screw shaft.

12. The downwash blocking apparatus according to claim 10, wherein the driving devices further include:
    a first motor mounting bracket mounted to the upper end portion of the first guide shell among the plurality of guide shells, to protrude inward the rotor guide;
    a second motor mounted to the first motor mounting bracket;
    a second screw shaft connected to an output shaft of the second motor; and
    a second upward-downward movement guide bracket having a female screw portion, with which the second screw shaft is screw-engaged, the second upward-downward movement guide bracket being mounted to an upper end portion of a second guide shell among the plurality of guide shells to protrude outwards from an axis of the rotor guide.

13. The downwash blocking apparatus according to claim 12, wherein a second stopper, selectively caught by a bottom portion of the second upward-downward movement guide bracket to limit a maximum downward movement distance of the second guide shell, is mounted to a lower end portion of the second screw shaft.

14. The downwash blocking apparatus according to claim 12, wherein the driving devices further include:
   a second motor mounting bracket mounted to the upper end portion of the second guide shell to protrude inward the rotor guide;
   a third motor mounted to the second motor mounting bracket;
   a third screw shaft rotatably connected to an output shaft of the third motor; and
   a third upward-downward movement guide bracket having a female screw portion, with which the third screw shaft is screw-engaged, the third upward-downward movement guide bracket being mounted to an upper end portion of a third guide shell among the plurality of guide shells to protrude outwards from an axis of the rotor guide.

15. The downwash blocking apparatus according to claim 14, wherein a third stopper, caught by a bottom portion of the third upward-downward movement guide bracket to limit a maximum downward movement distance of the third guide shell, is mounted to a lower end portion of the third screw shaft.

16. The downwash blocking apparatus according to claim 1, further including:
   a distance sensor mounted to a predetermined position of a lower portion of the rotor guide, the distance sensor being configured to detect a distance from a surface of the vertiport to the distance sensor; and
   a controller electrically connected to the driving devices and the distance sensor and configured to apply a driving signal to the driving devices when the distance detected by the distance sensor is less than a vertical length of the plurality of guide shells after deployment of the plurality of guide shells.

17. The downwash blocking apparatus according to claim 16, wherein, when the plurality of guide shells is moved downwards to be deployed as a result of driving of the driving devices according to the driving signal of the controller, a flow of the downwash blown from the rotor to the vertiport at a time of takeoff and landing of the flying vehicle is guided into the plurality of guide shells.

18. The downwash blocking apparatus according to claim 17, wherein the controller is configured to apply a restoration driving signal to the driving devices so that a deployment length of each guide shell is reduced in proportion to the distance detected by the distance sensor until the flying vehicle lands on the vertiport after the plurality of guide shells is deployed.

19. The downwash blocking apparatus according to claim 1, wherein the vertiport is provided with a downwash discharge port configured to discharge the downwash blown from the rotor in the plurality of guide shells into the downwash discharge port.

* * * * *